United States Patent [19]
Haba

[11] Patent Number: 5,479,313
[45] Date of Patent: Dec. 26, 1995

[54] TAPE CLEANER FOR MAGNETIC RECORDING AND REPRODUCING APPARATUS

[75] Inventor: Yoshiaki Haba, Kanagawa, Japan

[73] Assignee: Sony Corporation, Tokyo, Japan

[21] Appl. No.: 200,627

[22] Filed: Feb. 23, 1994

[30] Foreign Application Priority Data

Feb. 24, 1993 [JP] Japan ................................. 5-035495

[51] Int. Cl.⁶ ......................................................... G11B 3/58
[52] U.S. Cl. ........................................ 360/137; 15/DIG. 13
[58] Field of Search ................................. 360/128, 137; 369/71, 292; 15/DIG. 12, DIG. 13

[56] References Cited

U.S. PATENT DOCUMENTS

| | | | |
|---|---|---|---|
| 3,602,940 | 9/1971 | Barbeau et al. | 360/137 |
| 4,566,776 | 1/1986 | Kondoh | 118/657 |
| 5,045,962 | 9/1991 | Inoue et al. | 360/137 |
| 5,136,448 | 8/1992 | Kiriyama et al. | 360/128 |
| 5,144,513 | 9/1992 | Gadsby et al. | 360/137 |
| 5,238,753 | 8/1993 | Ryoke et al. | 428/694 |

*Primary Examiner*—Stuart S. Levy
*Assistant Examiner*—George J. Letscher
*Attorney, Agent, or Firm*—Jay H. Maioli

[57] ABSTRACT

A tape cleaner for a magnetic recording and reproducing apparatus includes a plurality of blades disposed so that their tip portions are simultaneously in contact with a magnetic tape in the transportation path of the magnetic tape to remove dust and magnetic powder attached to the magnetic tape, whereby dropout can be prevented and a highly demanding error rate can be satisfied.

11 Claims, 8 Drawing Sheets

TAPE CLEANER FOR MAGNETIC RECORDING AND REPRODUCING APPARATUS

BACKGROUND OF THE INVENTION

1. Field of the Invention

The present invention relates generally to a tape cleaner for a magnetic recording and reproducing apparatus and, more specifically, to a tape cleaner that mechanically scrapes against the magnetic tape of a tape recorder.

2. Description of the Background

In a conventional magnetic recording and reproducing apparatus such as a tape recorder and so on, a tape cleaner is used for removing dust, magnetic powder and the like from a magnetic tape.

Figure 7:
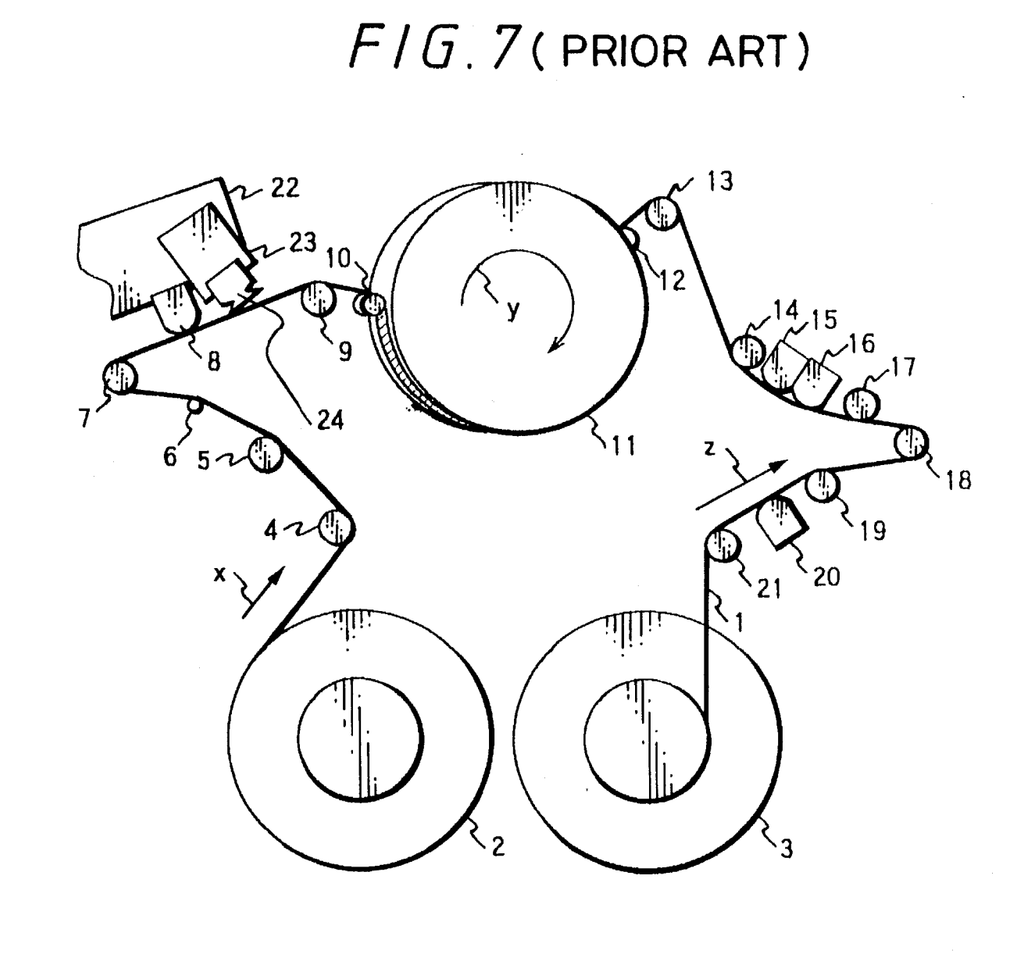
FIG. 7 is a diagram showing an example of a conventional tape cleaner of a magnetic recording and reproducing apparatus.
Figure 8:
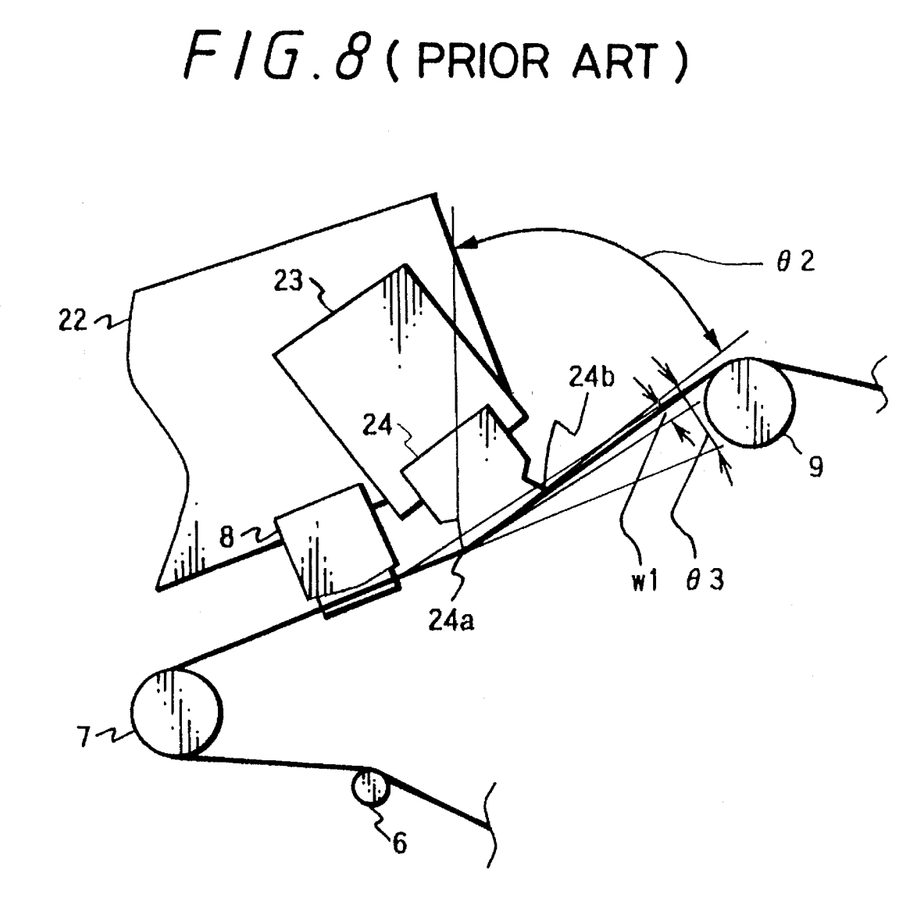
FIG. 8 is an enlarged view of a part of the conventional tape cleaner shown in FIG. 7.

FIG. 7 shows a construction of a tape cleaner of a magnetic recording and reproducing apparatus, and FIG. 8 shows an enlarged view of a portion of the tape cleaner of the magnetic recording and reproducing apparatus shown in FIG. 7. The conventional tape cleaner of the magnetic recording and reproducing apparatus will be described below with reference to FIGS. 7 and 8.

In FIG. 7, reference numeral 2 designates a supply reel, 3 a takeup reel, 4, 5, 7, 9, 10, 12, 13, 14, 17, 18, 19 and 21 fixed or rotary tape guides, respectively. Shown at 6 is a guide pin, 11 a rotary magnetic head apparatus on which a magnetic head (not shown) is mounted, 8 a full erase head, 15 a control head (CTL) for recording/reproduction, 16 a recording/reproducing head, and 20 a control head (CTL) for recording confirmation.

In the figure, reference numeral 24 designates a blade, the material of which is sapphire or ruby. As shown in this figure, the blade is mounted on the tip end of a member 23 which is mounted on a base stand 22 so that the tip of the blade is in contact with the recording surface of a magnetic tape 1 at a predetermined angle. The base stand 22, the member 23, and the blade 24 constitute the tape cleaner.

In the case of reel driving, the magnetic tape 1 drawn out from the supply reel 2 is transported in the direction indicated by the arrow x in FIG. 7, and then it is guided by the tape guides 4 and 5, guide pin 6, and tape guides 7, 9 and 10, so that it is guided to be wound around the rotary magnetic head apparatus 11 which is rotating in the direction indicated by the arrow y. Further, the magnetic tape is guided by the tape guides 12, 13, 14, 17, 18, 19 and 21 in order, and then taken up by the takeup reel 3.

During this transportation, when a video signal or an audio signal is recorded, oblique tracks are formed on the recording surface of the magnetic tape 1 by a rotary magnetic head (not shown) on the rotary magnetic head apparatus 11. Further, a control signal is recorded by the CTL head 15 and various signals are recorded by the recording and reproducing head 16. Furthermore, the control signal recorded by the CTL head 15 is reproduced by the CTL head 20 to confirm proper recording. In addition, dust, magnetic powder or the like attached on the magnetic tape 1 are removed from the magnetic tape 1 by the tip portion of the blade 24, whereby reduction in dropout and prevention of deterioration in error rate are intended.

FIG. 8 is an enlarged view of the tape cleaner in FIG. 7 showing the transportation path of the magnetic tape 1 between tape guides 7 and 9. As shown in FIG. 8, the left tip portion 24a of the blade 24 is urged against the magnetic surface of the magnetic tape 1 at an angle $\theta 3$. By making such an angle, magnetic powder dropped from the magnetic tape and dust are removed upon reproduction. The angle $\theta 3$ of the tip portion 24a of the blade 24 relative to the magnetic tape 1 is substantially equivalent to the wrapping angle $\theta b$ of the magnetic tape 1 relative to the blade 24. This is because upon microscopic observation the tip portion 24a of the blade 24 is round.

The wrapping angle (not shown) of the tape 1 around the full erase head 8 is set to 10.791°, the width w1 is set to 0.99 mm, the angle $\theta 2$ of the left side tip portion 24a c,f the blade 24 with respect to the bottom portion of the blade 24 is set to 60°, the angle $\theta 3$ between the line drawn from the bottom face 24b of the blade 24 and the line drawn from the path of the magnetic tape 1 as it approaches the tip portion 24a is set to 15.3357°. Further, the angle $\theta c$ between the magnetic tape 1 and the bottom portion of the blade 24 is set to 6°, and the angle between the magnetic tape 1 after passing tip portion 24a and the line drawn from the path of the magnetic tape 1 as it approaches the tip portion 24a is set to 9.3357°.

Further, in addition to the above-described tape cleaner, there has been proposed an apparatus in Japanese Patent Laid-Open Gazette No. 3-10387, in which a polygonal-shaped body has a blade disposed at each corner thereof and is intermittently rotated so that dust and magnetic powder attached to the magnetic tape are removed. The dust and magnetic powder attached to the blades are then cleaned by a brush-like secondary cleaner.

Further, the present applicant has previously proposed a tape cleaner in which the blade is brought into contact with the recording surface of the tape during tape transportation at a low speed, thereby removing dust and magnetic powder while the blade is separated from the recording surface of the tape during tape transportation at a high speed (see Japanese Patent Laid-Open Gazette No. 3-203079).

If a microscopic observation is made on the tip portion 24a of the blade 24 of the above-described tape cleaner, it is found that the magnetic surface of the magnetic tape 1 is not intimately in contact with the tip portion 24a. If intimate contact is not made, there can be a chance that dust and magnetic powder attached to the magnetic tape 1 cannot be removed completely. Further, if the dust and magnetic powder strongly adhere to the magnetic tape 1, it is difficult to remove them.

The dust and magnetic powder which are left unremoved by the blade 24 enter the rotary magnetic head apparatus 11, causing dropout upon reproduction. In addition, if the magnetic recording and reproducing apparatus in which the tape cleaner is provided is requested to satisfy a highly demanding error rate, as described above, it is unsatisfactory to provide only the single blade 24 to remove the dust and magnetic powder on the magnetic surface side of the magnetic tape 1.

Further, if the dust and magnetic powder that have been removed are collected on the blade 24, then the collected dust and magnetic powder again adhere to the magnetic tape 1 when the magnetic tape 1 is transported in the reverse direction, as indicated by the arrow z in FIG. 7. Moreover the collected dust and powder can cause head clog on the magnetic head (not shown) that is mounted on the rotary magnetic head apparatus 11 or also can cause dropout upon reproduction when the recording or reproduction is again performed.

OBJECT AND SUMMARY OF THE INVENTION

In view of the above, it is an object of the present invention to provide a tape cleaner for a magnetic recording and reproducing apparatus which can more positively remove dust and magnetic powder attached to a magnetic tape and prevent the once removed dust and magnetic powder from again attaching to the magnetic tape, thereby avoiding head clog, drastically decreasing dropout, and satisfying a highly demanding error rate.

According to one aspect of the present invention, there is provided a tape cleaner for a magnetic recording and reproducing apparatus having a plurality of blades which are disposed so that their tip portions are in contact with the magnetic recording medium in the transportation path thereof for cleaning the magnetic recording medium. Therefore, the dust and magnetic powder or the .like attached to the magnetic recording medium can be positively removed, whereby head clog can be prevented and dropout upon reproduction is reduced, making it possible to cope with a highly demanding error rate.

Further, according to another aspect of the present invention, of the plurality of blades, the angles of the foregoing blade and the following blade relative to the magnetic recording medium are set to different angles, respectively, and the plurality of blades set to have angles different from each other are utilized to clean the magnetic recording medium. Therefore, in addition to the above effect, when the recording medium is transported in the reverse direction, the dust and magnetic powder dropped from the foregoing blade in this direction can be positively removed by the following blade, and further, if the angle of the blade relative to the magnetic recording medium is set to be large, the dust and magnetic powder attached to the magnetic recording medium can be almost completely dropped. Thus, head clog can be prevented and hence the reliability of the apparatus can be improved.

According to a further aspect of the present invention, when a plurality of blades are provided, the angle of the following blade relative to the magnetic recording medium is set to be large as compared with the angle of the foregoing blade relative to the magnetic recording medium, and the plurality of blades thus set are utilized to clean the magnetic recording medium. Therefore, in addition to the above effect, when the recording medium is transported in the reverse direction, the dust and magnetic powder dropped from the foregoing blade in this direction can be positively removed by the following blade, and further, if the angle of the blade relative to the magnetic recording medium is set to be large, the dust and magnetic powder attached to the magnetic recording medium can be almost completely dropped. Thus, head clog can be prevented and hence the reliability of the apparatus can be improved.

Further, according to another aspect of the present invention, since the magnetic recording medium is cleaned by the plurality of blades between which there is no transportation system disposed, that is, there are no other elements of the apparatus disposed therebetween for contact with the magnetic recording medium, in addition to the above effect, the dust and magnetic powder are prevented from being attached to the transportation system and it is possible to positively remove the dust and magnetic powder from the magnetic recording medium.

Furthermore, according to another aspect of the present invention, since the magnetic recording medium is cleaned by the plurality of blades which are disposed before the head element to be protected, in addition to the above effect, head clog of the head element to be protected can be more positively prevented, and hence the reliability of the apparatus can be improved further.

The above and other objects, features, and advantages of the present invention will become apparent from the following detailed description of illustrative embodiments thereof to be read in conjunction with the accompanying drawings.

DETAILED DESCRIPTION OF PREFERRED EMBODIMENTS

Figure 1:
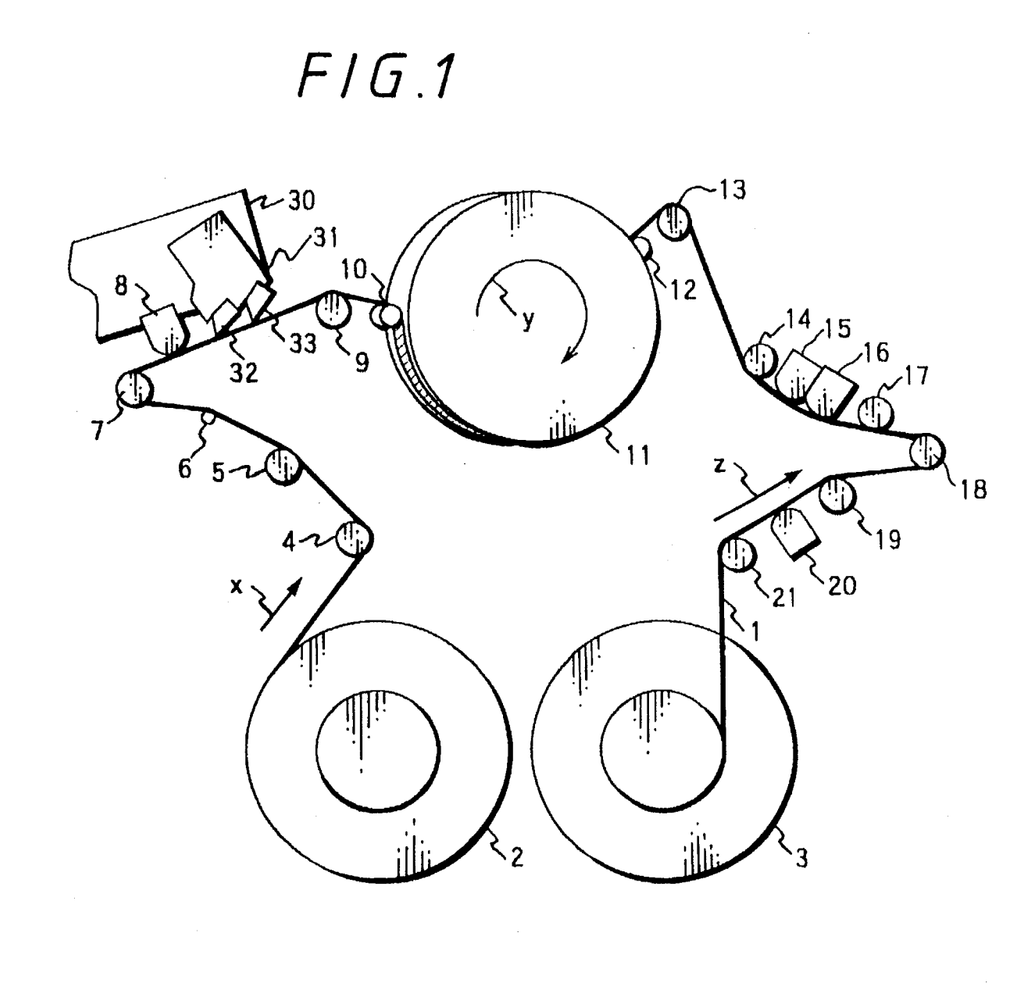
FIG. 1 is a diagram showing one embodiment of a tape cleaner of a magnetic recording and reproducing apparatus according to the present invention.

In FIG. 1, parts corresponding to those in FIGS. 7 and 8 are designated with the same reference numerals and will not be described in detail.

In FIG. 1, a member 31 is mounted on a base stand 30 by means of a screw, and two blades 32, 33 are mounted on the tip portion of the member 31. At this time, the blades 32, 33 are mounted so that the respective left side tip portions thereof are in contact with the magnetic surface of the magnetic tape 1.

The material of the blades 32, 33 is one that has high hardness and nonmagnetic properties, such as sapphire or ruby. Further, as shown in FIG. 1, the blades 32, 33 are mounted so that the tip portions thereof are in contact with the recording surface of the magnetic tape 1 at a predetermined angle. At this time, the angles between the tip portions of respective blades 32, 33 and magnetic tape 1 are set to be equal. The base stand 30, member 31, and blades 32 and 33 constitute the tape cleaner.

The magnetic tape 1 is drawn out from a slapply reel 2 and is transported in the direction indicated by the arrow x in FIG. 1. Then, it is guided by tape guides 4 and 5, guide pin 6, tape guides 7, 9 and 10, and wound around a rotary magnetic head apparatus 11 which is rotated in the direction indicated by the arrow y. Furthermore, it is guided by tape guides 12, 13, 14, 17, 18, 19 and 21, in order, and then taken up by a takeup reel 3.

During this time, when a video signal and an audio signal are recorded, oblique tracks are formed on the recording surface of the magnetic tape 1 by a rotary magnetic head (not shown) of the rotary magnetic head apparatus 11. Further, a control signal is recorded by a CTL head 15, various signals are recorded by a recording and reproducing head 16, and the control signal recorded by the CTL head 15 is reproduced by a CTL head 20 and then confirmed. In addition, dust and magnetic powder or the like attached to the magnetic tape 1 are removed twice from the magnetic tape 1 by the tip portions of the blades 32 and 33. Thus, dropout is reduced and error rate is prevented from being deteriorated.

Figure 2:
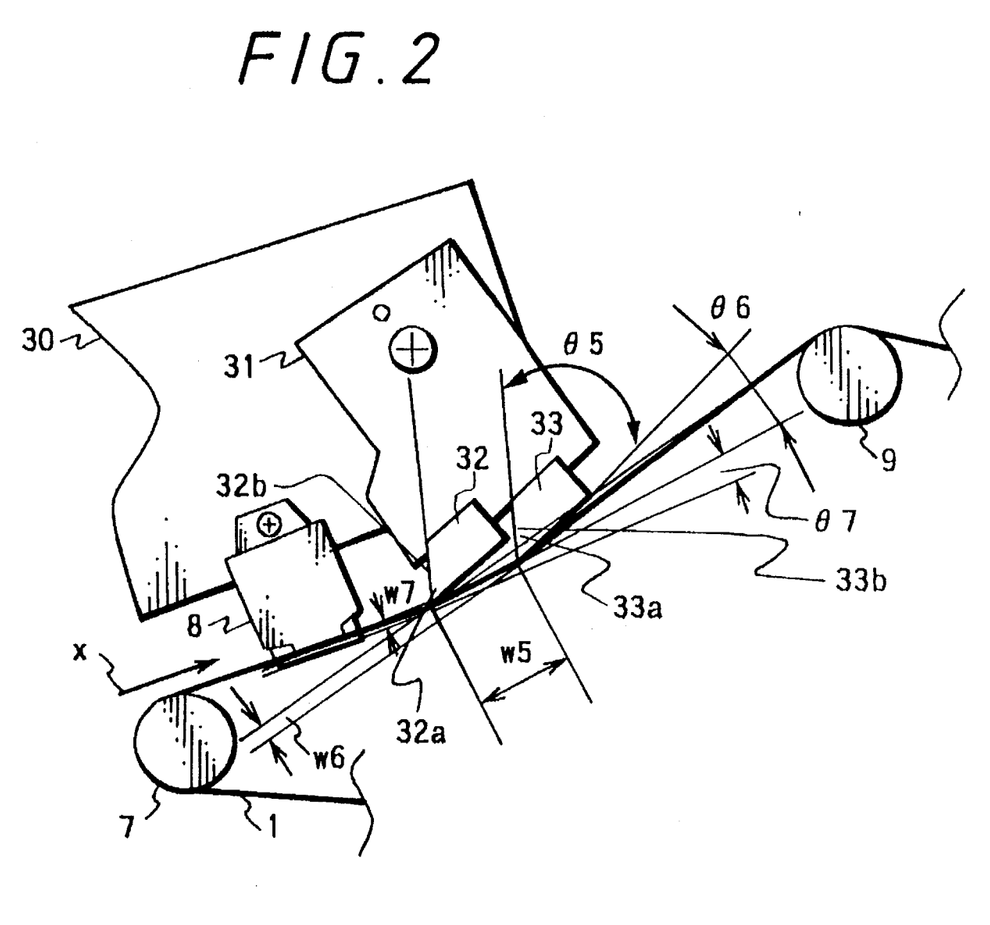
FIG. 2 is an enlarged view of a main portion of the embodiment of the tape cleaner shown in FIG. 1.

FIG. 2 is an enlarged view of the tape cleaner shown in FIG. 1 in which the tip portion 32a of the blade 32 as a foregoing blade and the tip portion 33a of the blade 33 as a following blade are disposed to be urged against the magnetic surface of the magnetic tape 1, respectively.

The wrapping angle of the tape around the full erase head 8 is set to 10.791°, the width w5 between the tip portion 32a of the first blade 32 and the tip portion 33a of the second blade 33 is set to 4.74 mm; the width w6, namely, a projection amount of the tip portion 33a of the blade 33 is set to 0.6 mm; and the width w7, namely, a projection amount of the tip portion 32a of the blade 32, measured with reference to a line that connects the tip portion 33a of the blade 33 and the point of the full erase head 8 at which the magnetic tape 1 ceases contact therewith and a line drawn from the tip portion 32a of the blade 32 parallel to the former line, is set to 0.57 min.

Further, the angles of the respective tip portions 32a, 33a of the blades 32, 33 relative to the respective bottom portions of the blades 32, 33, namely, the angles θ5 of the respective slant surfaces 32b, 33b of the blades 32, 33 are set to be between 30° and 60°, and the angle θ6 between the bottom portion of the blade 33 and the line drawn from tip portion 33a, aligned with the path of the magnetic tape 1 as it travels between the tip portion 32a of the blade 32 and the tip portion 33a of the blade 33, is set to 18.4349°. Further, the angle between the magnetic tape 1 and the bottom portion of the blade 33 is set to 9.4349°, however, it is adjustable within the range of 5° to 30°. The angle between the path of the magnetic tape 1 as it travels between the blade 33 and the tape guide 9 and the line drawn from the tip portion 32a of the blade 32 through the tip portion 33a of the blade 33, is set to 9°, and the angle equivalent to the wrapping angle of the magnetic tape 1 with respect to the tip portions 32a and 33a of the blades 32 and 33, namely, the angle θ7 between the line drawn through the tip portions 32a and 33a of the respective blades 32 and 33 and the line drawn from the point where the magnetic tape 1 ceases contact with the full erase head 8 through the tip portion 32a is set to 10.3°.

In the above magnetic recording and reproducing apparatus having the blades 32 and 33 disposed therein, when the magnetic tape 1 is transported in the direction shown by the arrow x in FIG. 1, dust and magnetic powder attached to the magnetic tape 1 are first removed by the tip portion 32a of the blade 32 in the foregoing position, and then dust and magnetic powder attached to the magnetic tape 1 are removed by the tip portion 33a of the blade 33 in the following position.

Next, if the magnetic tape 1 is transported in the direction indicated by the arrow z in FIG. 1 such as upon rewinding or the like, the dust and magnetic powder somewhat kept on the slant surface 33b of the blade 33 can be dropped and again attached to the magnetic tape 1. However, even though the dust and magnetic powder are again attached to the magnetic tape 1, when the magnetic tape 1 is transported in the reverse direction, the dust and magnetic powder again attached can be removed by the blade 32 which serves as the following blade.

As described above, according to the present embodiment, since the blades 32 and 33 having slant surfaces 32b, 33b of the same angle are employed and the two blades 32, 33 are utilized to remove the dust and magnetic powder attached to the magnetic tape 1, the dust and magnetic powder or the like attached to the magnetic tape 1 can be removed more than they could be by the tape cleaner in which only a single blade was utilized, and, in addition, dust and magnetic powder that are left unremoved by the foregoing blade 32 can be removed. Further, when the magnetic tape 1 is transported in the reverse direction the dust and magnetic powder dropped from the blade 33 as a foregoing blade in this direction and again attached to the magnetic tape 1 can be removed by the following blade 32. Thus, head clog and dropout upon reproduction can be prevented, and it is possible to satisfactorily cope with a highly demanding error rate.

Figure 3:
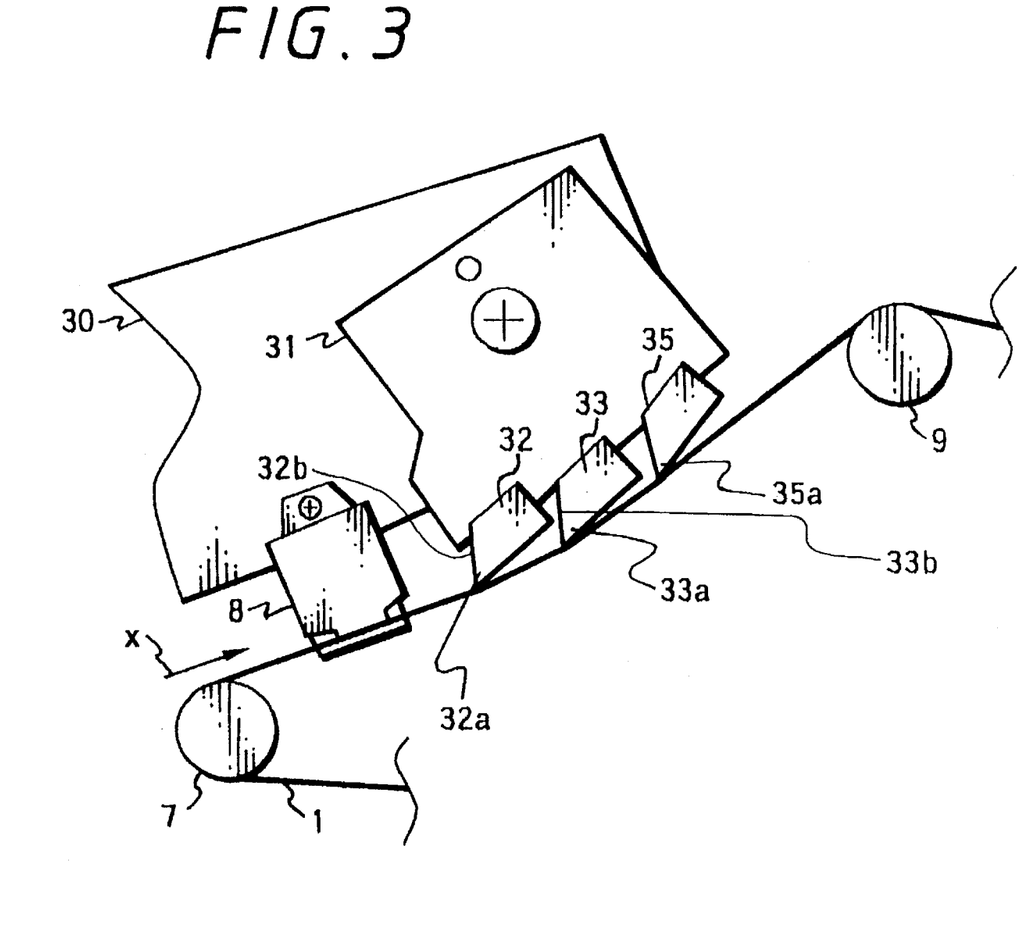
FIG. 3 is an enlarged view of a main portion of a second embodiment of a tape cleaner of a magnetic recording and reproducing apparatus according to the present invention.

FIG. 3 shows an example in which, for the tape cleaner shown in FIG. 2, one more blade 35 is provided so that three blades 32, 33 and 35 are used for removing the dust and magnetic powder attaching to the magnetic tape 1.

As shown in FIG. 3, the tip portion 32a of the blade 32 as a foregoing blade, the tip portion 33a of the blade 33 as an intermediate blade, and the tip portion 35a of the blade 35 as a following blade are respectively disposed to be urged against the magnetic surface of the magnetic tape 1. Here, the material of each blade 32, 33 and 35 is one that has high hardness and nonmagnetic properties, such as sapphire or ruby. Further, the angles of the slant surface 32b of the foregoing blade 32, the slant surface 33b of the blade 33 in the intermediate position, and the slant surface 35b of the following blade 35 are respectively set to be between 30° and 70°, and the angles of the tip portions 32a, 33a, and 35a of the blades 32, 33, and 35 relative to the magnetic tape 1 are set to be between 5° and 30°.

In the above magnetic recording and reproducing apparatus having the blades 32, 33 and 35 provided therein, when the magnetic tape 1 is transported in the direction shown by the arrow x in FIG. 3, dust and magnetic powder attached to the magnetic tape 1 are first removed by the tip portion 32a of the blade 32 in the foregoing position. Then, dust and magnetic powder attached to the magnetic tape 1 are removed by the tip portion 33a of the blade 33 in the intermediate position, and further, dust and magnetic powder attached to the magnetic tape 1 are removed by the tip portion 35a of the blade 35 in the following position.

Next, if the magnetic tape 1 is transported in the direction indicated by the arrow z in FIG. 1, such as in the rewinding mode or the like, it may be possible that the dust and magnetic powder somewhat kept on the slant surfaces 35b and 33b of the blades 35 and 33 can be dropped and again attached to the magnetic tape 1. However, even though they are again attached to the magnetic tape 1, when the magnetic tape 1 is transported in the reverse direction, the dust and magnetic powder again attached can be removed by the blade 32 as the following blade.

As described above, since three blades 32, 33 and 35 are utilized to remove the dust and magnetic powder attached to the magnetic tape 1, the dust and magnetic powder or the like attached on the magnetic tape 1 can be removed more than they could be by the tape cleaner in which two blades were used, and in addition, dust and magnetic powder that are left unremoved by the foregoing blade 32 and the blade 33 in the intermediate position can be removed by the blade 35 in the following position. Further, even when the magnetic tape 1 is transported in the direction opposite to the transport direction of the magnetic tape 1 upon reproduction, the dust and magnetic powder that are dropped from the blades 33 and 35 as intermediate and foregoing blades, respectively, in this direction and again attached to the magnetic tape 1 can be removed by the following blade 32. Thus, head clog and dropout upon reproduction can be prevented and it is possible to satisfactorily cope with a highly demanding error rate.

Figure 4:
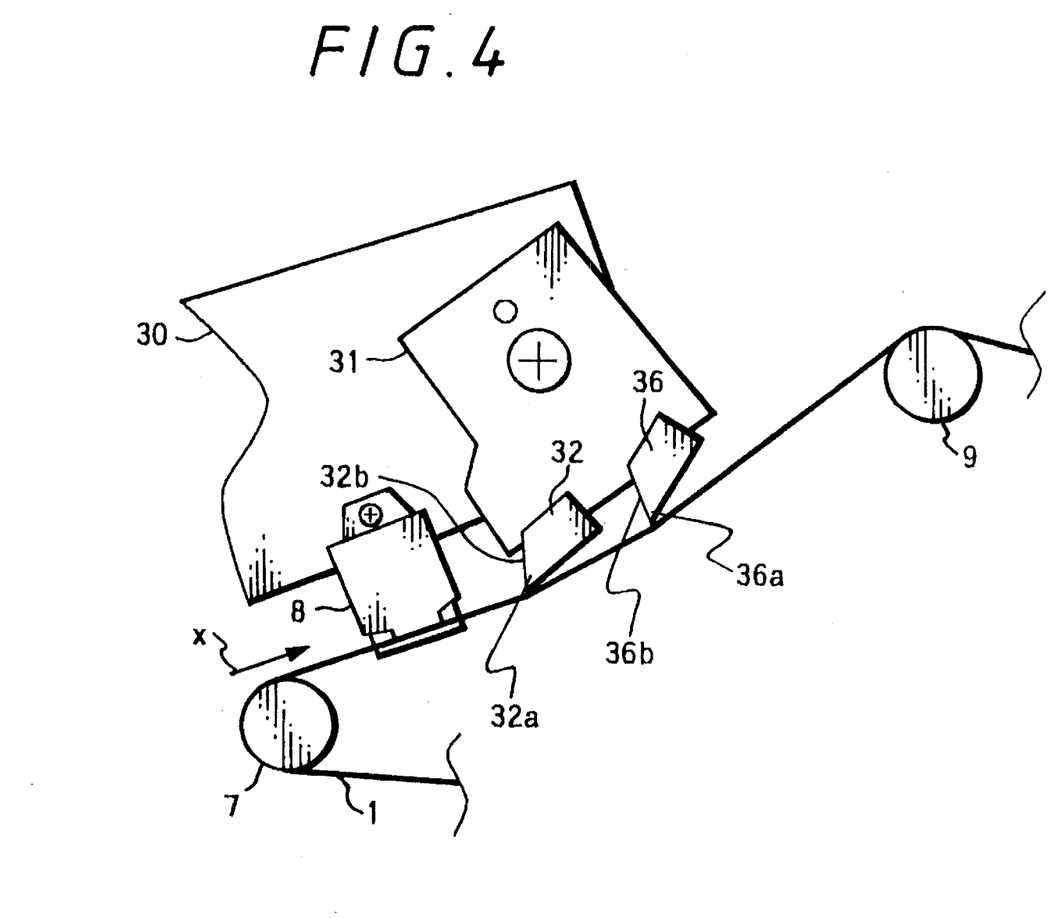
FIG. 4 is an enlarged view of a main portion of a third embodiment of a tape cleaner of a magnetic recording and reproducing apparatus according to the present invention.

FIG. 4 shows an embodiment, in which, unlike the tape cleaner shown in FIG. 2, the angle of the following blade 36 relative to the magnetic tape 1 is set to be larger than the angle of the foregoing blade 32 relative to the magnetic tape 1, the angle of the slant surface 36b relative to the magnetic tape 1 being set to almost a right angle, so that the two blades 32, 36 thus set remove dust and magnetic powder attached to the magnetic tape 1.

As shown in FIG. 4, the tip portion 32a of the blade 32 as a foregoing blade and the tip portion 36a of the blade 36 as a following blade are respectively disposed to be urged against the magnetic surface of the magnetic tape 1. The material of each blade 32, 36 is one that has high hardness and nonmagnetic properties, such as sapphire or ruby.

Further, the angles of the slant surface 32b of the foregoing blade 32 and the slant surface 36b of the following blade 36 are set to be between 30° and 70°, and the angles of the bottoms of the tip portions 32a and 36a of the blades 32 and 36 relative to the magnetic tape 1 are set to be between 5° and 30°.

In the above magnetic recording and reproducing apparatus having the blades 32 and 36 disposed therein, when the magnetic tape 1 is transported in the direction shown by the arrow x in FIG. 4, dust and magnetic powder attached to the magnetic tape 1 are first removed by the tip portion 32a of the blade 32 in the foregoing position, and then dust and magnetic powder attached to the magnetic tape 1 are removed by the tip portion 36a of the blade 36 in the following position. The angle of the slant surface 36b of the following blade 36 relative to the magnetic tape 1 is larger than that of the foregoing blade 32, or it is almost a right angle relative to the magnetic tape 1, that is, a right angle relative to the transportation direction of the magnetic tape 1.

Therefore, though the dust and the magnetic powder attached to the magnetic tape 1 are removed by the blade 36, since the propulsive power of the dust and magnetic powder owing to the transportation of the magnetic tape 1 is lost due to the slant surface 36b of the blade 36 which makes an almost right angle relative to the transportation direction of the magnetic tape 1, the dust and the magnetic powder removed by the blade 36 are almost positively dropped from the slant surface 36b of the blade 36 with the result that they are hardly held by the slant surface 36b of the blade 36.

On the other hand, when the magnetic tape 1 is made to be transported in the direction indicated by the arrow z in FIG. 1 such as upon rewinding or the like, if a small amount of dust and magnetic powder are kept on the slant surface 36b of the blade 36, there is a possibility that this small amount of dust and magnetic powder can be dropped and again attached to the magnetic tape 1. Nevertheless, even though they are again attached to the magnetic tape 1, when the magnetic tape 1 is transported in the reverse direction, the dust and magnetic powder again attached can be removed by the blade 32 as the following blade.

As described above, according to this embodiment, the blades 32 and 36 are employed, and the dust and magnetic powder attached on the magnetic tape 1 are removed by the foregoing blade 32, and further the dust and the magnetic powder left unremoved by the foregoing blade 32 is removed by the blade 36 which is disposed so that its slant surface 36b makes an almost right angle with the magnetic tape 1 so that the removed dust and the powders are dropped. Therefore, the dust and magnetic powder or the like attached to the magnetic tape 1 can be removed more than they could be by the tape cleaner in which one blade is employed, and in addition, dust and magnetic powder that are left unremoved by the foregoing blade 32 can be removed and dropped by the blade 36 in the following position. Further, even when the magnetic tape 1 is transported in the reverse direction the dust and magnetic powder dropped from the blade 36 as a foregoing blade in this direction and again attached to the magnetic tape 1 can be removed by the following blade 32. Thus, head clog and dropout upon reproduction can be prevented, it is possible to satisfactorily cope with a highly demanding error rate, and further the reliability of the apparatus can be improved.

Figure 5:
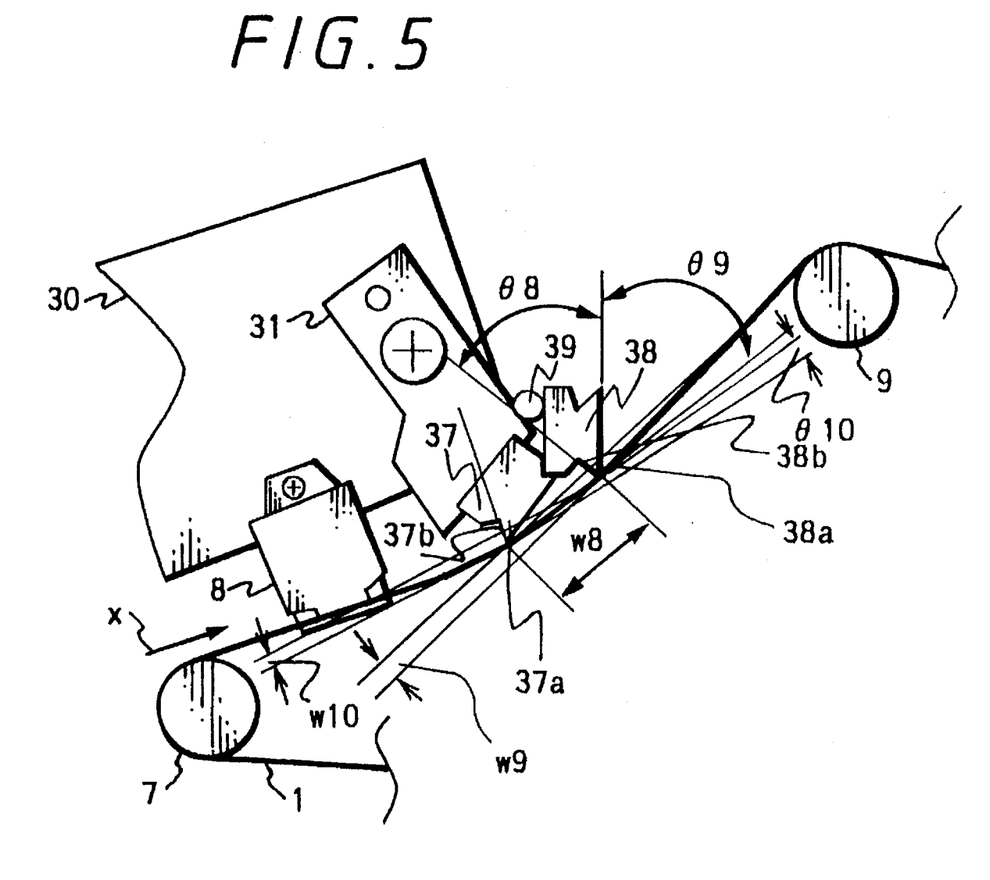
FIG. 5 is an enlarged view of a main portion of a fourth embodiment of a tape cleaner of a magnetic recording and reproducing apparatus according to the present invention.

FIG. 5 shows, unlike the tape cleaners shown in FIGS. 1 to 4, an embodiment in which there are employed a plurality of blades of a shape similar to that used in the conventional tape cleaner shown in FIGS. 7 and 8. As shown in FIG. 5, the member 31 is mounted on the base stand 30 by means of a screw and a blade 37 is attached to the tip portion of the member 31. A second blade 38 is engaged at its upper left portion with a concave portion of the right side of the blade 37, and then the blade 38 is fixed by a fixing member 39 which is placed between the upper portion of the blade 38 and the member 31. The material of each blade is one that has high hardness and nonmagnetic properties such as sapphire or ruby.

In addition, as shown in FIG. 5, the tip portion 37a of the blade 37 as a foregoing blade and the tip portion 38a of the blade 38 as a following blade are disposed to be urged against the magnetic surface of the magnetic tape 1.

The width w8 between the tip portion 37a of the blade 37 and the tip portion 38a of the blade 38 is set to 4.74 mm, the width w9, namely, the amount of projection of the tip portion 38a of the blade 38, is set to 1.02 mm, and the width w10, namely, the amount of projection of the tip portion 37a of the blade 37, measured between a line that connects the tip portion 38a of the blade 38 and the point at which the magnetic tape 1 ceases contact with the full erase head 8 and a line drawn from the tip portion 37a of the blade 37 parallel to the former line, is set to 0.33 mm.

Further, the wrapping angle of the full erase head 8 is set to 9.2058°. The angles of the tip portions 37a and 38a of the blades 37 and 38 relative to the bottom portions of the blades 37 and 38, namely, the angle θ8 between the slant surfaces 37b and 38b of the blades 37, 38, and the bottom portions thereof are set to be between 30° and 60°, and the angle θ9 between the lines drawn from the bottom portion of the blade 38 and from the tip portion 38a, aligned with the path of the magnetic tape 1 as it travels between the tip portion 37a of the blade 37 and the tip portion 38a of the blade 38, is set to 51.7146°. Further, the angle between the magnetic tape 1 and the bottom portion of the blade 38 is set to 40.3262°. The angle between the path of the magnetic tape 1 as it travels between the blade 38 and the tape guide 9 and the line drawn from the tip portion 37a of the blade 37 through the tip portion 38a of the blade 38, is set to 11.3884°, and an angle that is equivalent to a wrapping angle of the magnetic tape 1 with respect to the tip portions 37a and 38a of the blades 37 and 38, namely, the angle θ10 between the line drawn through the tip portions 37a and 38a of the blades 37 and 38, respectively, and the line drawn from the point where the magnetic tape 1 ceases contact with the full erase head 8 through the tip portion 37a of the blade 37, is set to 4.3°.

In the above-described magnetic recording and reproducing apparatus having blades 37 and 38 disposed therein, when the magnetic tape 1 is transported in the direction shown by the arrow x in FIG. 5, dust and magnetic powder attached to the magnetic tape 1 are first removed by the tip portion 37a of the blade 37 in the foregoing position, and then dust and magnetic powder attached to the magnetic tape 1 are removed by the tip portion 38a of the blade 38 in the following position.

On the other hand, if the magnetic tape 1 is transported in the direction indicated by the arrow z in FIG. 1, such as upon rewinding or the like, when dust and magnetic powder are kept on the slant surfaces 38b of the blade 38, there is the possibility that this retained dust and magnetic powder can be dropped and again attached to the magnetic tape 1. Nevertheless, even though they are again attached to the magnetic tape 1, when the magnetic tape 1 is transported in the reverse direction, the dust and magnetic powder again attached can be removed by the blade 37 which serves as the following blade.

In the above embodiment, since the blades 37 and 38 having the slant surfaces 37b and 38b of which like angles are employed, and the two blades 37 and 38 are utilized for removing dust and magnetic powder attached to the magnetic tape 1, dust, magnetic powder, or the like attached to the magnetic tape 1 can be removed more than they could be by the tape cleaner in which only a single blade is employed, and in addition, the dust and magnetic powder left unremoved by the foregoing blade 37 can be removed with the result that dropout upon reproduction can be prevented and it is possible to satisfactorily cope with a highly demanding error rate.

Further, even when the magnetic tape 1 is transported in the reverse direction, the dust and magnetic powder dropped from the blade 38 as a foregoing blade in this direction and again attached to the magnetic tape 1 can be removed by the following blade 37. Thus, head clog and ,dropout upon reproduction can be prevented, it is possible to satisfactorily cope with a highly demanding error rate, and further the reliability of the apparatus can be improved.

Furthermore, the above-described blades 37 and 38 are formed not only of the tip portions 37a and 38a but also of tip portions at the side opposite to the tip portions 37a and 38a. Therefore, when the tip portions 37a and 38a are worn out, the blades may be remounted to face the opposite tip portion to the magnetic tape 1, respectively, with the result that the blades 37 and 38 can be used twice as long as compared with the case where only one side thereof is used.

Figure 6:
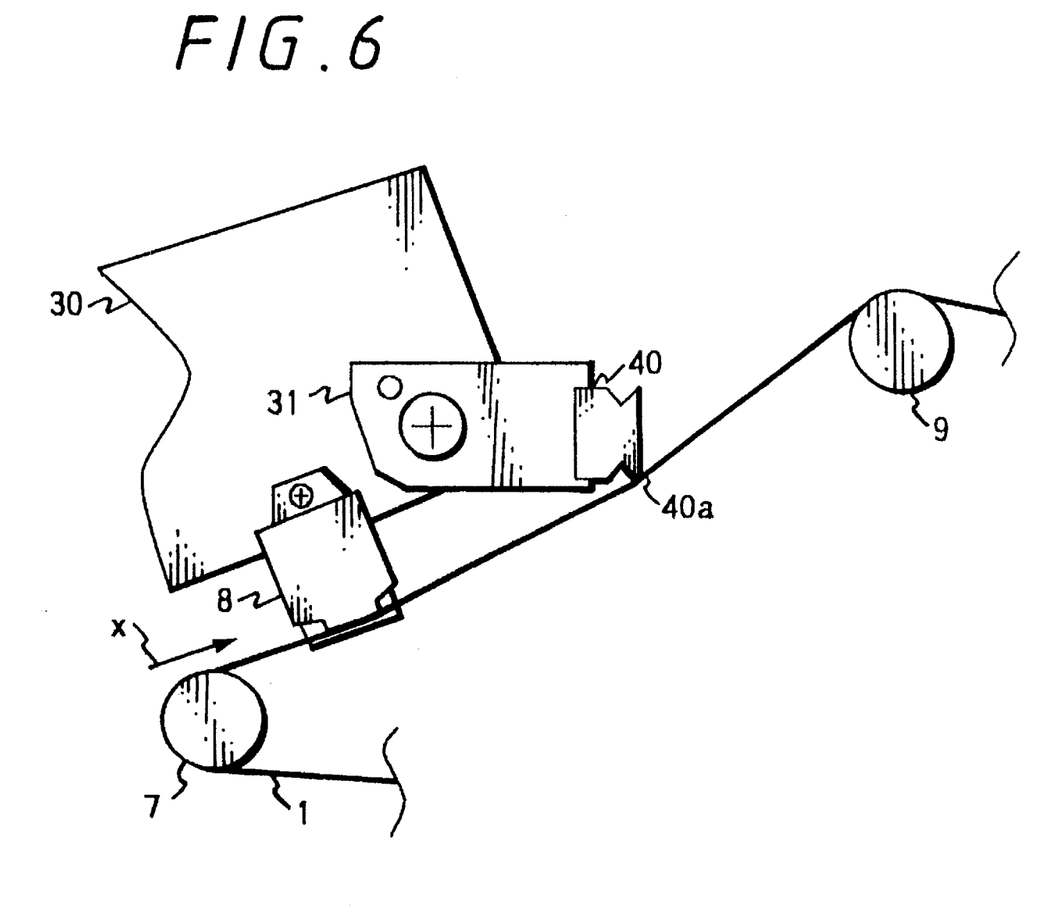
FIG. 6 is an enlarged view of a main portion of a fifth embodiment of a tape cleaner of a magnetic recording and reproducing apparatus according to the present invention.

FIG. 6 shows an embodiment in which, unlike the tape cleaners shown in FIGS. 1 to 5, the angle of the blade employed in the conventional tape cleaner shown in FIGS. 7 and 8 relative to the magnetic tape 1 is set to be large. As shown in FIG. 6, the member 31 is mounted on the base stand 30 by means of a screw, and a blade 40 is mounted at the tip portion of the member 31. Further, the blade 40 is disposed so that its tip portion 40a is urged against the magnetic surface of the magnetic tape 1. The material of the blade 40 is again one that has high hardness and nonmagnetic properties, such as sapphire and ruby.

In the magnetic recording and reproducing apparatus having the blade 40 thus disposed therein, when the magnetic tape 1 is transported in the direction indicated by the arrow x in FIG. 6, dust and magnetic powder attached to the magnetic tape 1 can be removed by the tip portion 40a of the blade 40. As described above in connection with blade 36 of FIG. 4, the blade 40 is disposed so that the slant surface of the tip portion 40a makes an almost right angle relative to the magnetic tape 1.

Therefore, though the dust and magnetic powder attached to the magnetic tape 1 are removed by the blade 40, since the propulsive power of the dust and magnetic powder owing to the transportation of the magnetic tape 1 is lost due to the tip portion 40a of the blade 40 which makes an almost right angle relative to the transportation direction of the magnetic tape 1, the dust and the magnetic powder removed by the blade 40 are almost positively dropped from the blade 40.

In the above embodiment, there is employed the blade 40 that is disposed to make an almost right angle with the slant surface of the tip portion relative to the magnetic tape 1. The blade 40 is first utilized to remove the dust and magnetic powder attached to the magnetic tape 1 and the removed dust and magnetic powder are almost completely dropped. Therefore, the dust and magnetic powder or the like attached to the magnetic tape 1 can be removed and dropped more than they could be by the tape cleaner in which the angle of the blade relative to the magnetic tape 1 is small. Thus, dropout upon reproduction can be prevented, it is possible to satisfactorily cope with a highly demanding error rate, and hence the reliability of the apparatus can be improved.

Further, the above-described blade 40 has formed not only the tip portion 40a but also a tip portion at the side opposite to the tip portion 40a. Therefore, when the tip portion 40a is worn out, the blade may be remounted to face the opposite tip portion to the magnetic tape 1 with the result that the blade 40 can be used for twice as long as compared with the case where only one side thereof is used.

In each of the above embodiments, since there are no tape transportation elements disposed between the plurality of blades, the dust and magnetic powder can be prevented from being attached to the tape transportation elements, and the dust and magnetic powder can be positively removed from the magnetic recording medium. Moreover, while in the above embodiments description has been made of a case where at most three blades are utilized, four or five blades may be utilized if cost is not taken into consideration, and further, the angles of the plurality of blades can be set to various angles in accordance with the purpose. Furthermore, since the above respective tape cleaners do not utilize a complicated mechanism such as a vacuum mechanism, they can be constructed by a small number of parts, embodied with relatively low cost, maintained with ease, and further they can extend the duration of cleaning effect.

Having described specific preferred embodiments of the present invention with reference to the accompanying drawings, it is to be understood that the invention is not limited to those precise embodiments, and that various changes and modifications may be effected therein by one skilled in the art without departing from the spirit or the scope of the present invention as defined in the appended claims.

What is claimed is:

1. A tape cleaner for a magnetic recording and reproducing apparatus disposed in a transportation path of a magnetic recording medium comprising:

a holder;

a foregoing blade mounted on said holder and having a slant surface and a bottom surface forming a tip at one corner thereof, said foregoing blade having a concave portion formed therein; and     a following blade engaged in said concave portion of said foregoing blade and mounted on said holder by a fixing member arranged between an upper portion of said following blade and said holder, said following blade being at a position after said foregoing blade when said magnetic recording medium travels in a forward direction and having a slant surface and a bottom surface forming a tip at one corner of said following blade, such that said tip of said foregoing blade and said tip of said following blade are simultaneously in contact with a surface of said magnetic recording medium to clean said magnetic recording medium, wherein said tip of said foregoing blade and said tip of said following blade are oriented in a same direction opposite the forward travelling direction of said magnetic recording medium and an angle of said slant surface of said following blade relative to said magnetic recording medium is larger than an angle of a slant surface of said foregoing blade relative to said magnetic recording medium.

2. A tape cleaner for a magnetic recording and reproducing apparatus according to claim 1, wherein there is no transportation system disposed between said plurality of blades.

3. A tape cleaner for a magnetic recording and reproducing apparatus according to claim 1, wherein said foregoing blade and said following blade are disposed before a head element to be protected when said magnetic recording medium travels in a forward direction.

4. A tape cleaner for a magnetic recording and reproducing apparatus according to claim 1, further comprising an intermediate blade disposed at a position after said foregoing blade and before said following blade when said magnetic recording medium travels in a forward direction.

5. A tape cleaner for a magnetic recording and reproducing apparatus according to claim 1, wherein an angle between each said slant surface and each said bottom surface of each said tip is between 30° and 60°.

6. A tape cleaner for a magnetic recording and reproducing apparatus according to claim 5, wherein a projection amount of a tip of said foregoing blade relative to said following blade is 0.57 mm.

7. A tape cleaner for a magnetic recording and reproducing apparatus according to claim 5, wherein a projection amount of a tip of said following blade relative to said foregoing blade is 0.6 mm.

8. A tape cleaner for a magnetic recording and reproducing apparatus according to claim 1, wherein an angle of said bottom surface of said foregoing blade relative to said magnetic recording medium is the same as an angle of said bottom surface of said following blade relative to said magnetic recording medium.

9. A tape cleaner for a magnetic recording and reproducing apparatus according to claim 8, wherein said angle is between 5° and 30°.

10. A tape cleaner for a magnetic recording and reproducing apparatus according to claim 1, wherein said angle of said following blade is almost a right angle.

11. A tape cleaner for a magnetic recording and reproducing apparatus according to claim 1, wherein each of said foregoing blade and said following blade further comprises a second slant surface forming a second tip portion with the bottom surface at a second corner thereof, said second corner being opposite said one corner.

* * * * *